United States Patent
Yu

(10) Patent No.: US 6,351,775 B1
(45) Date of Patent: Feb. 26, 2002

(54) LOADING BALANCING ACROSS SERVERS IN A COMPUTER NETWORK

(75) Inventor: Philip Shi-Lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/866,461

(22) Filed: May 30, 1997

(51) Int. Cl.$^7$ ............................................. G06F 15/173
(52) U.S. Cl. ..................... 709/238; 709/239; 709/240; 709/241; 709/242; 370/237; 370/400
(58) Field of Search ................................ 709/242, 239, 709/240, 241, 238; 370/237, 400

(56) References Cited

U.S. PATENT DOCUMENTS

| | | | |
|---|---|---|---|
| 5,371,852 A | | 12/1994 | Attanasio et al. |
| 5,517,620 A | * | 5/1996 | Hashimoto et al. ......... 709/242 |
| 5,526,414 A | * | 6/1996 | Bedard et al. .............. 379/221 |
| 5,544,313 A | * | 8/1996 | Shachnai et al. ........... 709/219 |
| 5,828,847 A | * | 10/1998 | Gehr et al. ................. 709/239 |
| 5,864,535 A | * | 1/1999 | Basilico ..................... 370/231 |
| 5,930,348 A | * | 7/1999 | Regnier et al. ............. 379/221 |
| 6,078,943 A | * | 6/2000 | Yu .............................. 709/105 |
| 6,091,720 A | * | 7/2000 | Bedard et al. .............. 370/351 |

FOREIGN PATENT DOCUMENTS

| | | |
|---|---|---|
| JP | 8-214063 | 8/1996 |

OTHER PUBLICATIONS

M. Colajanni et al., "Scheduling Algorithms for Distributed Web Servers", RC 20680 (91683) Jan. 6, 1997, Computer Science/Mathematics, Research Report, 29 pages.

T. Brisco, "DNS Support for Load Balancing", Apr. 1995, 6 pages, Network Working Group, Rutgers University.

Daniel M. Dias et al., "A Scalable and Highly Available Web Server", (not dated), 8 pages, IBM Research Division, T. J. Watson Research Center, Yorktown Heights, N. Y. 10598.

Eri D. Katz et al., "A scalable HTTP server: The NCSA prototype", 1994, pp. 155–164, vol. 27, Computer Networks and ISDN Systems.

* cited by examiner

Primary Examiner—Krisna Lim
(74) Attorney, Agent, or Firm—F. Chau & Associates, LLP

(57) ABSTRACT

A dynamic routing of object requests among a collection or cluster of servers factors the caching efficiency of the servers and the load balance or just the load balance. The routing information on server location can be dynamically updated by piggybacking meta information with the request response. To improve the cache hit at the server, the server selection factors the identifier (e.g. URL) of the object requested. A partitioning method can map object identifiers into classes; and requester nodes maintain a server assignment table to map each class into a server selection. The class-to-server assignment table can change dynamically as the workload varies and also factors the server capacity. The requester node need only be informed on an "on-demand" basis on the dynamic change of the class-to-server assignment (and thus reduce communication traffic). In the Internet, the collection of servers can be either a proxy or Web server cluster and can include a DNS and/or TCP-router. The PICS protocol can be used by the server to provide the meta information on the "new" class-to-server mapping when a request is directed to a server based on an invalid or obsolete class-to-server mapping. DNS based routing for load balancing of a server cluster can also benefit. By piggybacking meta data with the returned object to reassign the requester to another server for future requests, adverse effects of the TTL on the load balance are overcome without increasing traffic.

75 Claims, 15 Drawing Sheets

Assignment Table
N=16, M=3

| Class  | 1 | 2 | 3 | 4 | 5 | 6 | 7 | 8 | 9 | 10 | 11 | 12 | 13 | 14 | 15 | 16 |
|--------|---|---|---|---|---|---|---|---|---|----|----|----|----|----|----|----|
| Server | 2 | 3 | 2 | 2 | 2 | 2 | 2 | 3 | 1 | 3  | 1  | 2  | 2  | 3  | 2  | 3  |

Fig. 3

LOADING BALANCING ACROSS SERVERS IN A COMPUTER NETWORK

CROSS-REFERENCE TO RELATED APPLICATIONS

The present invention is related to U.S. Pat. No. 6,078,943, filed Feb. 7, 1997 and issued on Jun. 20, 2000 entitled "A Method and Apparatus for Dynamic Interval-based Load Balancing," by P. Yu, and (provisional) Ser. No. 60/031,849, filed provisionally on Dec. 5, 1996, entitled "A Computer System and Method for Load Balancing with Selective Control," by Dias, et al. The above-identified U.S. Pat. No. 6,078,943, the above-identified provisional application and the present invention are commonly assigned to the International Business Machines Corporation of Armonk, N.Y. The descriptions set forth in the above-identified issued patent and provisional application are hereby incorporated by reference in their entirety into the present application.

FIELD OF THE INVENTION

The present invention relates generally to providing load balancing across a collection (or cluster) of servers such as proxy servers and Web servers in the Internet environment. A more particular aspect of the present invention relates to a method of updating routing information using meta data piggybacked with the response to client requests. Yet another aspect is related to a load balancing method which also optimizes caching efficiency.

GLOSSARY OF TERMS

While dictionary meanings are also implied by certain terms used here, the following glossary of some terms may be useful.

Internet
    The network of networks and gateways that use the TCP/IP suite of protocols.
Client
    A client is a computer which issues commands to the server which performs the task associated with the command.
Server
    Any computer that performs a task at the command of another computer is a server. A Web server typically supports one or more clients.
World Wide Web (WWW or Web)
    The Internet's application that lets people seeking information on the Internet switch from server to server and database to database by clicking on highlighted words or phrases of interest (hyperlinks). An Internet WWW server supports clients and provides information. The Web can be considered as the Internet with all of the resources addressed as URLs and which uses HTML to display the information corresponding to URLs and provide a point-and-click interface to other URLs.
Universal Resource Locator (URL)
    A way to uniquely identify or address information on the Internet. Can be considered to be a Web document version of an e-mail address or a fully-qualified network file name. They can be accessed with a Hyperlink. An example of a URL is "http://www.philipyu.com:80/table.html". Here, the URL has four components. Starting from the left, the first specifies the protocol to use, separated from the rest of the locator by a ":". Next is the hostname or IP address of the target host; this is delimited by the "//" on the left and on the right by a "/" or optionally a ":". The port number is optional, and is delimited on the left from the hostname by a ":" and on the right by a "/". The fourth component is the actual file name or program name. In this example, the ".html" extension means that this is an HTML file.
HyperText Markup Language (HTML)
    HTML is a language which can be used, among other things, by Web servers to create and connect documents that are viewed by Web clients. HTML uses Hypertext documents.
Hypertext Transfer Protocol (HTTP)
    HTTP is an example of a stateless protocol, which means that every request from a client to a server is treated independently. The server has no record of previous connections. At the beginning of a URL, "http:" indicates the file should be retrieved using http.
Internet Browser or Web Browser
    A graphical interface tool that runs Internet protocols such as http, and display results on the user's screen. The browser can act as an Internet tour guide, complete with pictorial desktops, directories and search tools used when a user "surfs" the Internet. In this application the Web browser is a client service which communicates with the World Wide Web.
Client Cache
    Client caches are typically used as primary caches for objects accessed by the client. In a WWW environment, client caches are typically implemented by web browsers and may cache objects accessed during a current invocation, i.e., a nonpersistent cache, or may cache objects across invocations.
Caching Proxies
    Specialized servers in a network which act as agents on the behalf of the client to locate a cached copy of an object. Caching proxies typically serve as secondary or higher level caches, because they are invoked as a result of cache-misses from client caches.
HTTP Daemon (HTTPD)
    A server having Hypertext Markup Language and Common Gateway Interface capability. The HTTPD is typically supported by an access agent which provides the hardware connections to machines on the intranet and access to the Internet, such as TCP/IP couplings.

BACKGROUND

The traffic on the World Wide Web is increasing exponentially. Proxy servers, especially at a gateway to a large organization or region, can comprise a collection of computing nodes. Similarly, at popular (hot) Web sites, a collection (or cluster) of computing nodes is used to support the access demand.

To achieve good performance in a server cluster, the load should be balanced among the collection of nodes. This should be tempered by the need to optimize the cache hit ratio in a given server in the cluster by localizing identical object requests.

Previous work on load balancing in a multi-processor or multiple node environment, such as the IBM S/390 Sysplex, primarily focused on scheduling algorithms which select one of multiple generic resources for each incoming task or user session. The scheduler controls the scheduling of every incoming task or session and there is no caching of the resource selection.

One known method for balancing the load among geographically distributed replicated sites is known as the Round-Robin Domain Name Server (RR-DNS) approach. In the paper by Katz, E., Butler, M., and McGrath, R., entitled "A Scaleable HTTP Server: The NCSA Prototype", Computer Networks and ISDN Systems, Vol. 27, 1994, pp. 68–74, the RR-DNS method is used to balance the node across a set of web server nodes. Here, the set of distributed sites is represented by one URL (e.g., www.hotsite.com); a cluster sub-domain for this distributed site is defined with its sub-domain name server. The sub-domain name server maps the name resolution requests to different IP addresses (in the distributed cluster) in a round-robin fashion. Thus, subsets of the clients will be assigned to each of the replicated sites. In order to reduce network traffic, a mapping request is not issued for each service request. Instead, the result of the mapping request is saved for a "time-to-live" (TTL) interval. Subsequent requests issued during the TTL interval retain the previous mapping and hence will be routed to the same server node.

A problem with the RR-DNS method is that a load imbalance among the distributed sites may result (see e.g., Dias, D. M., Kish, W., Mukherjee, R., and Tewari, R., in "A Scaleable and Highly Available Web Server", Proc. 41st IEEE Computer Society Intl. Conf. (COMPCON) 1996, Technologies for the Information Superhighway, pp. 85–92, February 1996). The load imbalance can be caused by caching of the association between a name and IP address at various gateways, fire-walls, and domain name-servers in the network. Thus, for the TTL period all new client requests routed through these gateways, fire-walls, and domain name-servers will be assigned to the single site stored in the cache. Those skilled in the art will realize that a simple reduction in the TTL value will not solve the problem. In fact, low TTL values are frequently not accepted by many name servers. More importantly, a simple reduction of TTL value may not reduce a load skew caused by unevenly distributed client request rates.

One method of load balancing within a local cluster of nodes is to use a so-called TCP router as described in: "A Virtual Multi-Processor Implemented by an Encapsulated Cluster of Loosely Coupled Computers," by Attanasio, Clement R. and Smith, Stephen E., IBM Research Report RC 18442, 1992; and U.S. Pat. No. 5,371,852, entitled "Method and Apparatus for Making a Cluster of Computers Appear as a Single Host," issued Dec. 6, 1994 which is hereby incorporated by reference in its entirety. Here, only the address of the TCP router is given out to clients; the TCP router distributes incoming requests among the nodes in the cluster, either in a round-robin manner, or based on the load on the nodes. It should be noted that this TCP router method is limited to a local cluster of nodes.

More recently, in the paper by Colajanni, M., Yu, P., and Dias, D., entitled "Scheduling Algorithms for Distributed Web Servers," IBM Research Report, RC 20680, January 1997, which is hereby incorporated by reference in its entirety, a multi-tier round robin method is described which divides the gateways into multiple tiers based on their request rates. Requests from each tier are scheduled separately using a round robin algorithm. This method can also handle a homogeneous distributed server architecture.

In all of the above approaches, the goal is to balance the load among a collection of servers. The dynamic routing decision does not take into account the identity of the object being requested. In other words, multiple requests for the same object may be routed to different servers to balance the load. This will result in a poor cache hit ratio which is especially severe for proxy servers since the potential number of distinct Web pages referenced can be very large. Although in a Web server cluster, a static partition can be made to the Web pages wherein each partition is assigned a different (virtual) host name or IP, a static partitioning approach lacks the flexibility to cope with dynamic load changes and moreover, is not scaleable.

Thus, there is a need for an improved load balancing method and apparatus in a server cluster which not only balances the load across the cluster but also optimizes the cache hit ratio in a given server in the cluster by localizing identical object requests. The present invention addresses such a need.

There is also a need for an improved routing method which assigns each server to handle a subset of the object space dynamically according to workload conditions and routes object requests to the server assigned to the subspace associated with the object. The present invention also addresses such a need.

SUMMARY

In accordance with the aforementioned needs, the present invention is directed to an improved method and apparatus for dynamic routing object requests among collection of servers that takes into account either: the caching efficiency of the servers and load balance; or just the load balance.

The present invention also has features which can dynamically update server routing information by "piggy-backing" meta information with the response to the routing requests. The present invention has other features which can improve the cache hit ratio at a server by mapping a server based on the identifier (e.g., URL) of the object requested and dynamically updating this mapping if workload conditions change. In an Internet environment, the collection of servers can include, but is not limited to, a proxy server cluster or a Web server cluster.

A method having features of the present invention for dynamically routing object requests among a collection of server nodes, includes the steps of: piggybacking meta information with a requested object; and dynamically updating routing information for a server assignment according to the meta information.

A method having features of the present invention for dynamic routing object requests among a collection of server nodes while optimizing cache hits, further includes the steps of: mapping an object identifier to a class; and assigning a server based on the class and a class-to-server assignment table.

The present invention has still other features which can inform the requester node in an "on-demand" basis of a dynamic change in a class-to-server assignment. The class-to-server assignment can change dynamically as the workload varies. To avoid costly broadcasting of the changes to all potential requesters, or forcing requesters to first obtain a mapping each time an request is sent, the server can advantageously continue to serve an object request even if it is not the one assigned to process that class. However, the server can indicate in a header of the returned object (or response), the information on the new class-to-server assignment.

Furthermore, the present invention's features for piggybacking meta information with requested objects can also be applied to a conventional DNS routing in the Internet to improve load balancing in a server cluster. This should be distinguished from the concept of using an object's URL (or object class) to make a server assignment (to improve the cache hits). DNS routing has a valid interval (TTL) for address mapping. The present invention has features which allow server assignments to be generated at an interval smaller than the TTL and thus better reflect true load conditions. Changes in server assignment can be piggybacked with the returned object, avoiding added traffic, so that future requests can be sent to the new server.

The present invention has still other features which can dynamically and incrementally change the class-to-server assignment based on the workload demand to balance the load.

According to yet other features of the present invention, in an Internet environment, the PICS protocol may be used to communicate various types of information. PICS can be used by the server to piggyback the meta information on a new class-to-server mapping when a request is directed to a server based on an obsolete class-to-server mapping entry. PICS can also be used by the requester to query the coordinator for the current class-to-server mapping.

Those skilled in the art will appreciate that the present invention can be applied to general distributed environments as well as the World Wide Web.

BRIEF DESCRIPTION OF THE DRAWINGS

These, and further, objects, advantages, and features of the invention will be more apparent from the following detailed description of a preferred embodiment and the appended drawings wherein:

FIG. 3 is an example of the "class-to-server" assignment table;

DETAILED DESCRIPTION

Figure 1:
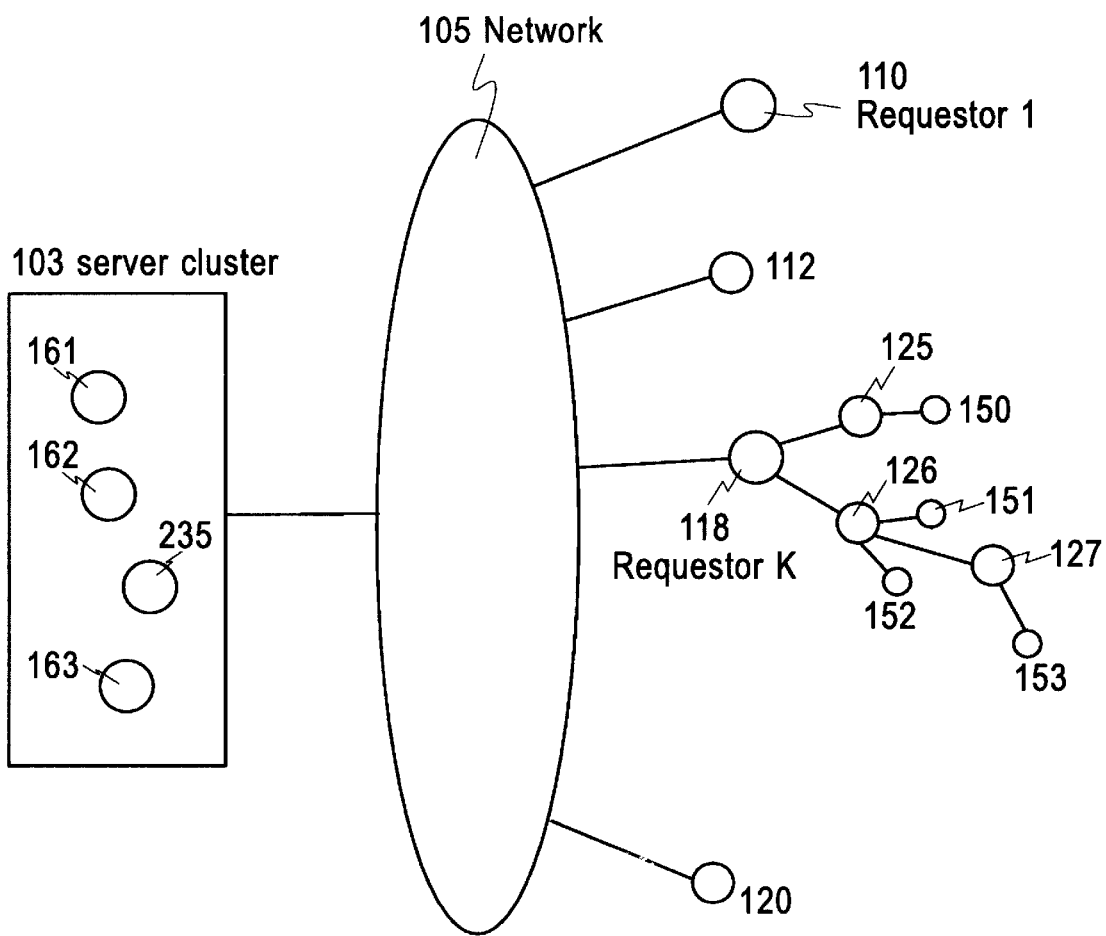
FIG. 1 is a diagram of an Internet environment applicable to the present invention.

FIG. 1 is a diagram of an Internet environment applicable to the present invention. As depicted, Requesters (110–153), which can be include any of conventional proxy server nodes (118, 125–127), client workstations and personal computers (also called PCs) (110, 112, 120, 150–153), are connected to a network (105). Proxy servers, workstations, and PCs are well known in the art. An example of the proxy server node is the Internet Connection Server (ICS) sold by IBM. Requesters request services from the server cluster (103), via the network (105). Examples of the network include, but are not limited to, the Internet, the World Wide Web, an Intranet and local area networks (LANs). The server cluster includes multiple server nodes (161–163) to handle high traffic demand. It can be either a proxy server or a Web server cluster. The servers in the cluster can include, but are not limited to, products such as are sold by IBM under the trademarks S/390 SYSPLEX, SP2, or RS6000 workstations. As is conventional, each request can be handled by any server in the cluster. Typical service requests include World-Wide-Web page accesses, remote file transfers, electronic mail, and transaction support.

Although requests can in principle be processed by any of the server nodes, routing requests for the same object to a single server node will result in a better cache hit probability at the same server node, and hence better performance. As will be described below, the present invention has features which not only balance the load among the server nodes in the cluster, but which also achieve a high cache hit probability.

Figure 2:
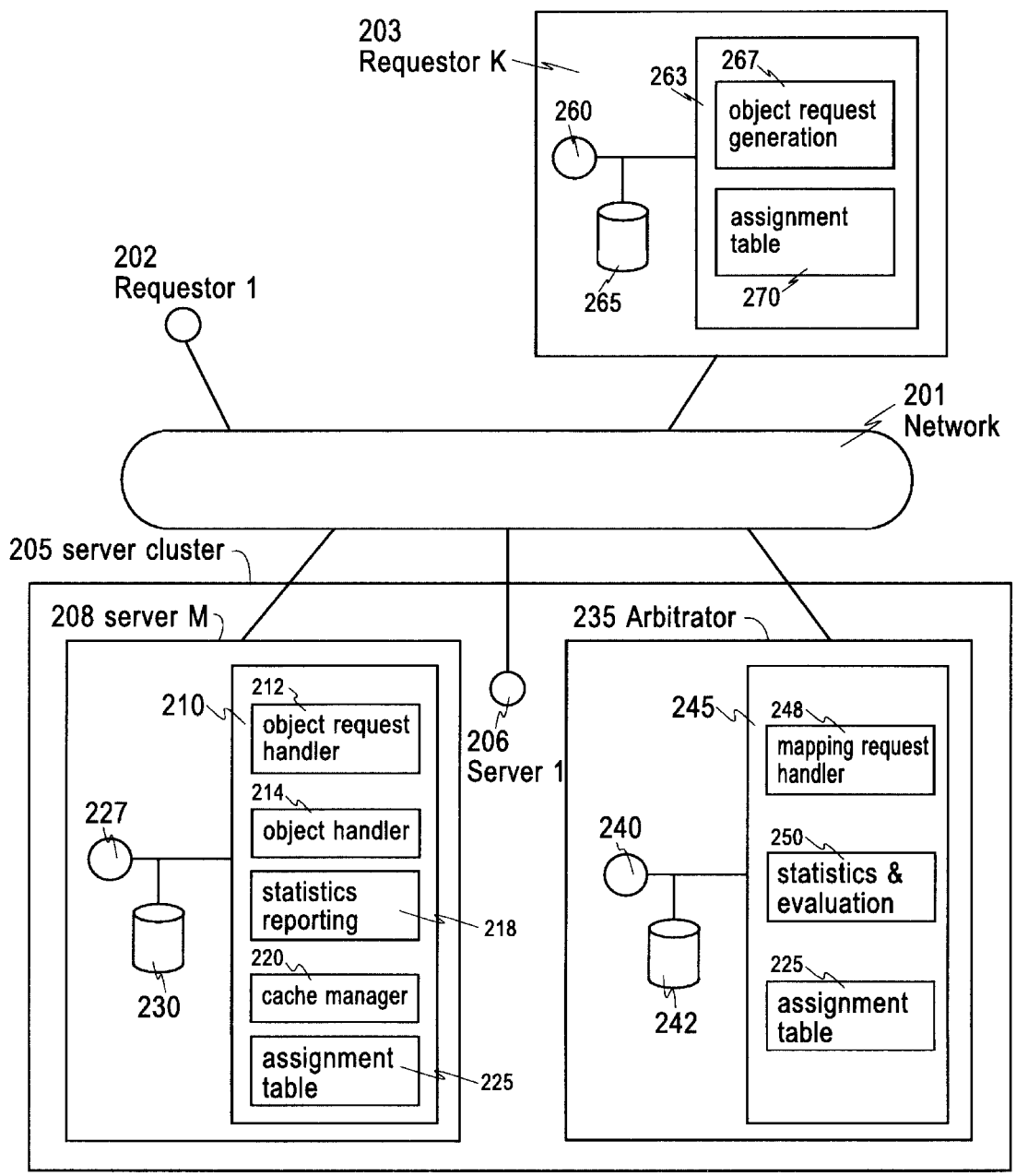
FIG. 2 is a more detailed example of a general environment having features of the present invention.

By way of overview, a routing method according to the present invention uses a logic identifier or symbolic name (e.g. URL) of the object in selecting the server to handle the request. A partitioning method is also provided to map object identifiers into classes; and a requester node preferably maintains a class-to-server assignment table (FIG. 3) to map each class into a server selection. A preferred partitioning method is to use a conventional hashing function to hash an object URL into a given number of hash classes. This hash function will preferably be given and known to all participating servers and requester nodes by an arbitrator 235 (FIG. 2).

The arbitrator 235 monitors the load of each server and dynamically updates the class-to-server assignment to improve the load balancing. The present invention also provides a method to inform the requester node "on-demand" in the event of a dynamic change of the class-to-server assignment by the servers 103.

A request from a requester node may need to traverse several intermediate requester nodes (i.e. proxy servers) before reaching the server cluster 103. For example, node 150 needs to traverse two levels of proxy nodes, 125 and 118, before reaching the sever cluster 103. If the server cluster is a proxy server cluster, the server selection is preferably done by the requesters 110–120 closest to the proxy server cluster 103. In the case of a Web server cluster, the Web server selection may be done at the intermediate requesters on the path.

The present invention also has features for efficiently communicating routing information between requester and server nodes using "piggybacked" meta-data. In a HTTP implementation, the information exchange can be included as meta-data in an object header using existing web protocols. PICS ("Platform for Internet Content Selection") specifies a method of sending meta-information concerning electronic content. PICS is a Web Consortium Protocol Recommendation (see http://www.w3.org/PICS). PICS was first used for sending values-based rating labels, such as "How much nudity is associated with this content," but the format and meaning of the meta-information is fully general. In PICS, meta-information about electronic content is grouped according to the "rating service" or producer-and-intended-usage of the information, and within one such group, any number of categories or dimensions of information may be transmitted. Each category has a range of permitted values, and for a specific piece of content, a particular category may have a single value or multiple values. In addition, the meta-information group (known as a "PICS label") may contain expiration information. There are also facilities for permitting a PICS label to apply to more than one piece of electronic content. Each PICS label for a specific piece of electronic content may be added or removed from the content independently.

For example, an image file may be sent from a server with a single PICS label whose "rating service" field indicates it contains values-based rating labels according to the "Safe-Surf" rating system. According to the present invention, as it passes through an enterprise proxy, the image file may also receive a second PICS label whose "rating service" field indicates it contains class-to-server assignment information. As it passes through a departmental proxy, the second PICS label may be stripped. Thus, the client computer may only sees the first PICS label. The HTTP protocol has been augmented with request headers and response headers that support PICS. The technical bodies which define other common application protocols, such as NNTP, are now also considering adding PICS support. As part of these protocols, a list of the types of PICS labels desired may be included with a request. PICS also specifies a query format for receiving PICS information from a central label bureau server. A sample PICS label is: (PICS-1.1 "http://the.rating.service" label for "http://the.content" exp "1997.07.01T08:15-0500" r(n 4 s 3 v 2 1 0)) where the 'n' 's' 'v' 'l' are transmit names for various meta-information types, and the applicable values for this content are 4 (for n), 3 (for s), 2 (for v) and 0 (for l). Only software which recognizes the ID "http://the.rating.service" would know how to interpret these categories and values.

In a preferred embodiment, two different kinds of PICS labels are used. The first kind of PICS label, referred to as a "reassign" label or (R-label), is used by the server node in the cluster to indicate the "current" server assignment for the object class of the returned object. The second kind of PICS label, referred to as an "assignment" label or (A-label), is used by the requester to determine the current server assignment of the URL of an object from the arbitrator which provides the label bureau function in this case.

FIG. 2 depicts a more detailed example of a network (201) and system having features of the present invention. As depicted, a requester node (202–203) is used to represent a computing node that can issue requests through the network (201). The requester node preferably includes a CPU (260), memory (263) such as RAM, and storage devices (265) such as DASD or disk, and/or other stable magnetic, electrical or optical storage. The memory (263) stores requester 203 logic (details described with reference to FIG. 13) in accordance with the present invention, preferably embodied as computer executable code which can be loaded from a stable program storage (265) into memory (263) for execution by CPU (260). Those skilled in the art will also appreciate that the requester (203) logic can also be downloaded to the requester via the network (201) for execution by the CPU (260). The requester 203 logic includes an object request generation routine (267) (with details depicted in FIG. 14) and maintains a copy of the class-to-server assignment table (270).

The arbitrator (235) represents any conventional computing node that can monitor server traffic and make an adjustment to the "class-to-server" assignment. The arbitrator (235) preferably includes a CPU (240), memory (245) such as RAM, and storage devices (242) such as DASD, and/or other stable magnetic, electrical or optical storage. The memory (245) stores the arbitrator logic of the present invention (with details depicted in FIG. 9) preferably embodied as computer executable code which is loaded from a program storage (242) into memory (245) for execution by CPU (240). The arbitrator logic is divided for clarity and by way of example only, into several components including: a mapping request handler (248), and a statistic and evaluation routine (250). These components will be described in detail with reference to FIGS. 12 and 10, respectively. The main data structure maintained is the class-to-proxy assignment table (225). The operations on the class-to-proxy assignment table (225) will be explained with the various components.

Servers 1 . . . M (206–208) can comprise any conventional computing node that can handle service requests such as providing data/object accesses and/or file transfers requested by the requester (203). The server node (208) includes CPU (227), memory (210) and storage devices (230) such as DASD, and/or other stable magnetic, electrical or optical storage. The memory (210) stores the server logic of the present invention (with details depicted in FIG. 4) preferably embodied as computer executable code which is loaded from storage (230) into memory (210) for execution by CPU (227). The server node logic is divided for clarity and by way of example only, into several components: an object request handler (212); an object handler (214); and a statistic reporting routine (218). These components are explained in details in FIGS. 7, 5, and 8, respectively. It also includes a cache manager (220) and maintains a copy of the class-to-server assignment table (225).

Figure 4:
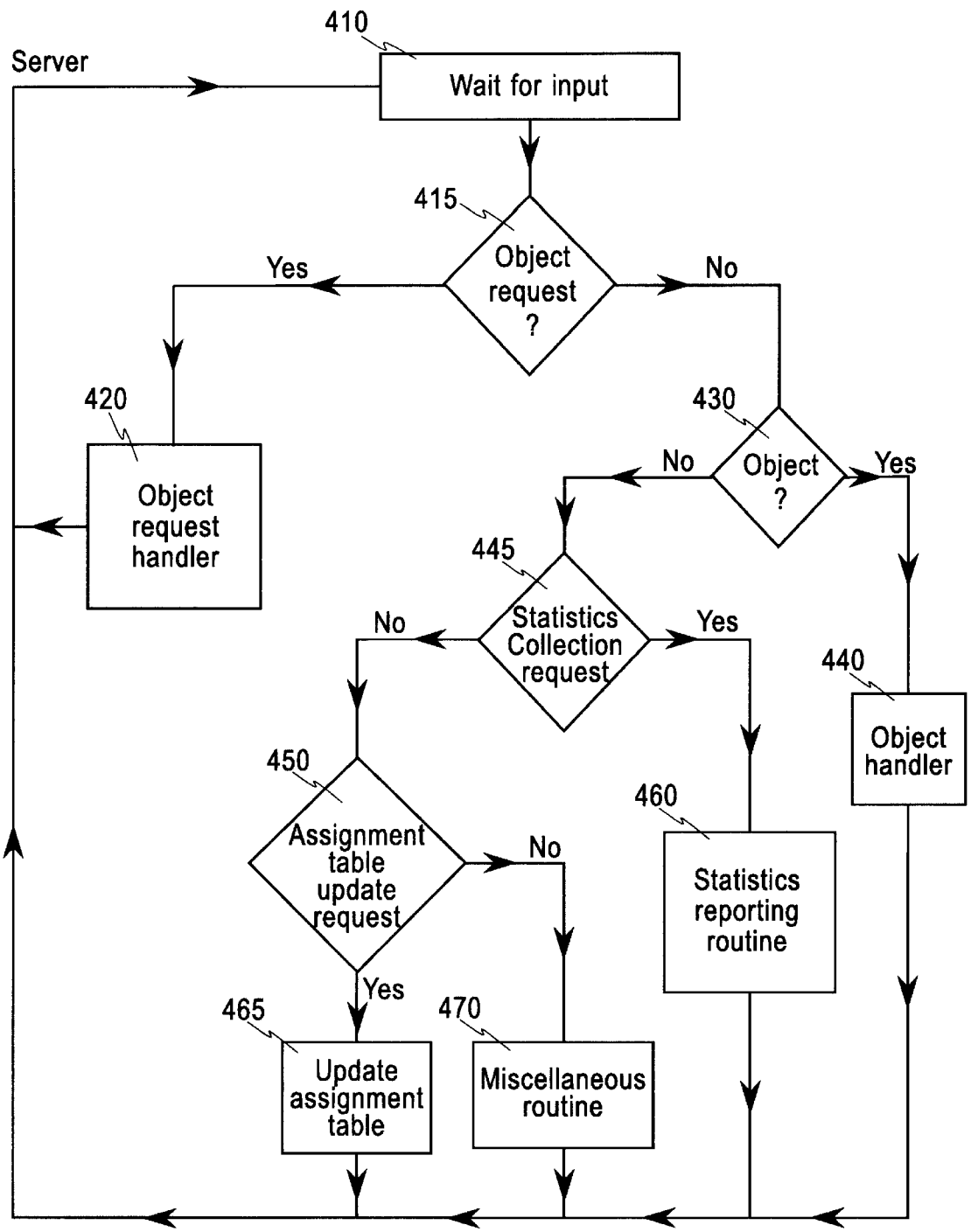
FIG. 4 is an example of the server logic of FIG. 2.
Figure 5:
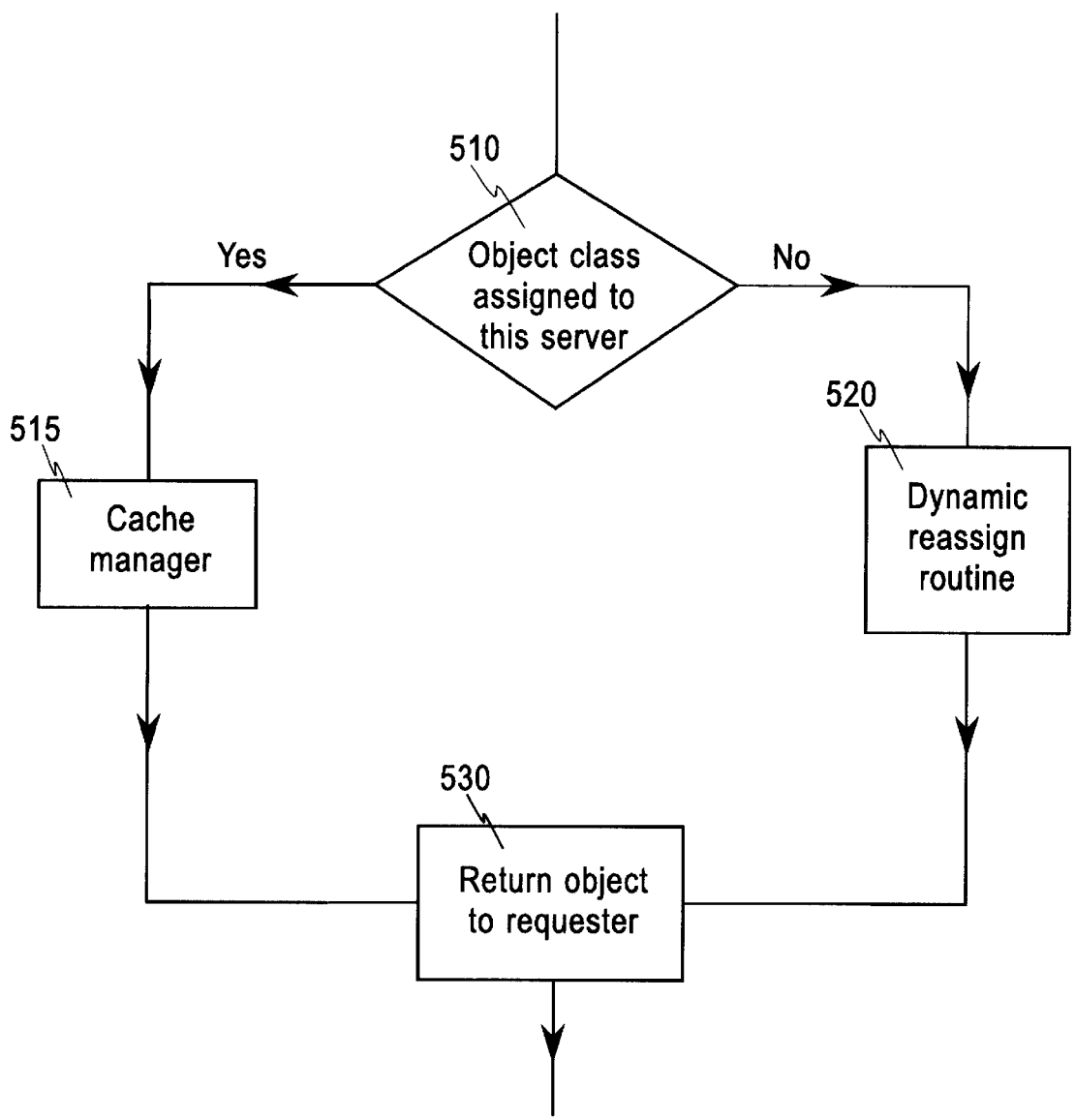
FIG. 5 is an example of the object handler of the server.

FIG. 3 provides an example of the assignment table (225, 270) for N=16 and M=3, where N is preferably the number of object classes, i.e., the size of the hash or assignment table, and M is the number of servers. Let Co be the assignment table (225, 270) that assigns class k to server C(k). Referring again to FIG. 2, not only the arbitrator (235) and each server (206,208) node in the cluster, but also the requester nodes (202,203) can maintain a copy of the assignment table (225, 270). The table (270) at the requesters are generally are not up-to-date, i.e., not synchronized with the server (208) or arbitrator (235) assignment tables (225). The present invention has features which eliminate the need to send costly update messages to maintain the tables in synchronization, and preferably updates the class-to-server mapping "on demand" using piggybacked meta data. FIG. 4 depicts an example of the server (208) logic stored in memory (210) for execution on CPU (227) in accordance with the present invention. Let C(.) be the assignment table (225, 270) that assigns class k to server C(k). As depicted, in step 410, the server waits for input. In step 415, depending upon the input received, different actions will be taken. If the input received is an object request, the object request handler 212 is invoked, in step 420. A more detailed example of the object request handler will be described with reference to FIG. 7. In step 430, if the input received is an object, the object handler 214 is invoked, in step 440. A more detailed example of the object handler will be described with reference to FIG. 5. In step 445, if the input received is a statistics collection request (from the arbitrator), in step 460, the statistics reporting routine (218) will be invoked. A more detailed example of the statistics reporting routine will be described with reference to FIG. 8. In step 450, if the input received is an assignment table update request (from the arbitrator), the C(k), k=1, . . . , M, will be updated accordingly, in step 465. For other types of inputs, which are not the focus of the present invention (such as the conventional HTTP "pull" request, or an FTP request) an appropriate miscellaneous handler (470) can be invoked. FIG. 5 depicts an example of the object handler (214). In step 510, if the object class of the received object (see step 750 in FIG. 7) belongs to a class assigned to this server as indicated by the assignment table, the cache manager 220 is invoked, in step 515. The cache manager determines whether this object should be cached and if so, which currently cached objects should be replaced. Then, in step 530, the object is returned to the requester. If in step 510, the object class of the received object does not belong to a class assigned to this server (as indicated by the assignment table), then in step 520 the dynamic reassign routine is invoked. A detailed example of the dynamic reassign routine will be described with reference to FIG. 6.

Figure 6:
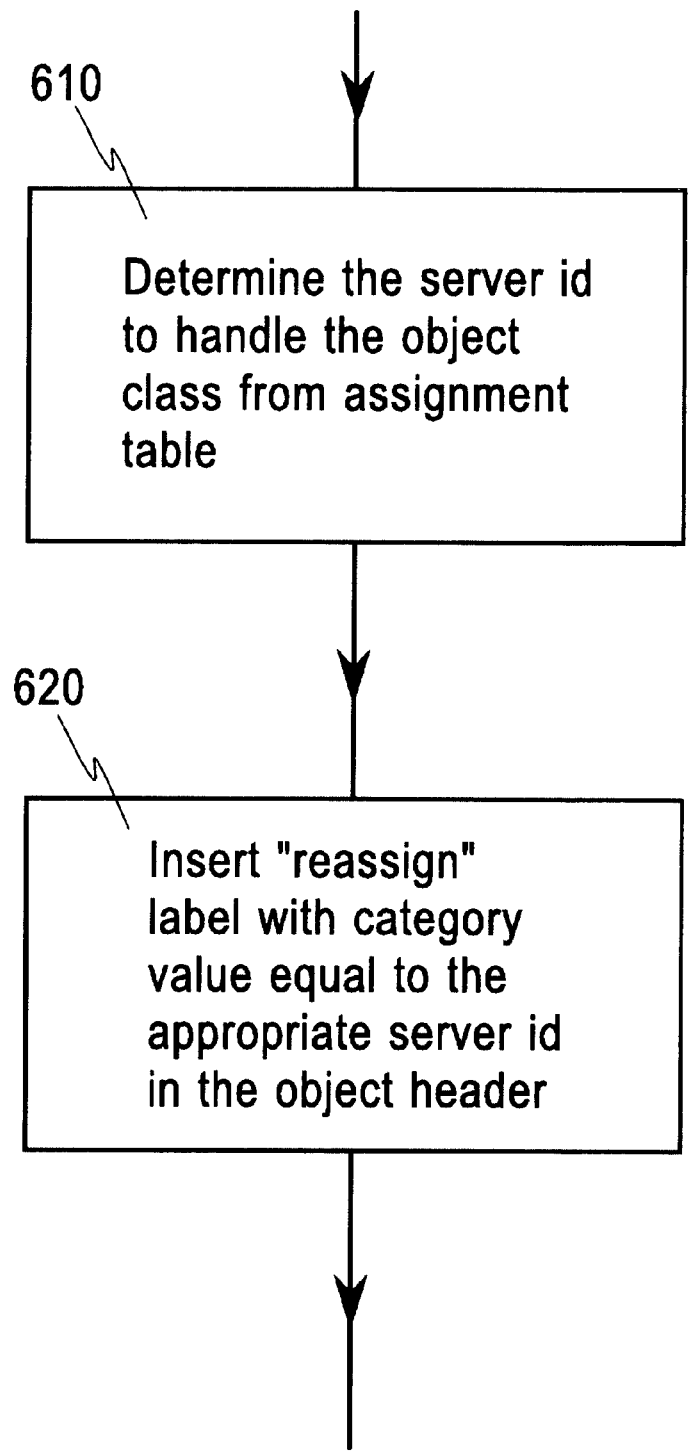
FIG. 6 is an example of the dynamic reassign routine of the object handler of the server.

FIG. 6 depicts an example of the dynamic reassign routine (step 520). As depicted, in step 610, the appropriate Server id (or IP address) to handle the object Class is determined from the assignment table (FIG. 3). In step 620, an R-label is inserted to the header of the object where the category value indicates the Server (FIG. 3) assigned to handle this Class (FIG. 3) of object.

Figure 7:
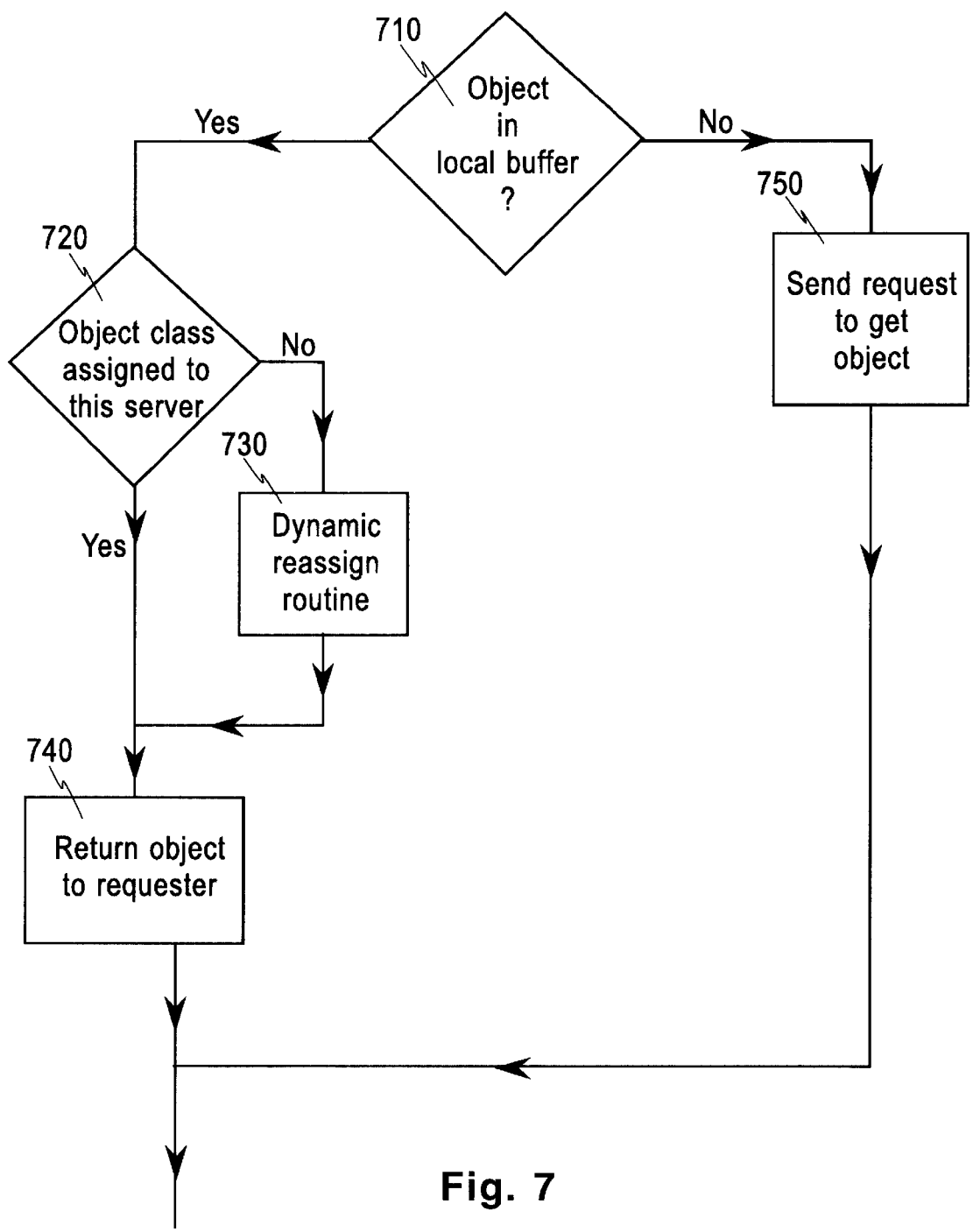
FIG. 7 is an example of the object request handler of the server.

FIG. 7 depicts an example of the object request handler 212. As depicted, in step 710, if the object is found in the local buffer, the assignment table (225) is checked to determine if the object Class (FIG. 3) is to be handled by this Server (FIG. 3) in step 720. If not, the dynamic reassign routine is invoked (FIG. 6). In step 740, the object is returned to the requester. In step 710, if the object is found not to have been cached locally, a request is sent to get the object (on behalf of the requester) in step 750.

In the following description, let CS(j,i) be the number of requests for objects in class i as received by server j (during the current measurement interval); and let CA(i) be the total number of requests toward objects in class i as received by all servers. Furthermore, denote SA(j) as the total number of requests for the object classes assigned to server j.

Figure 8:
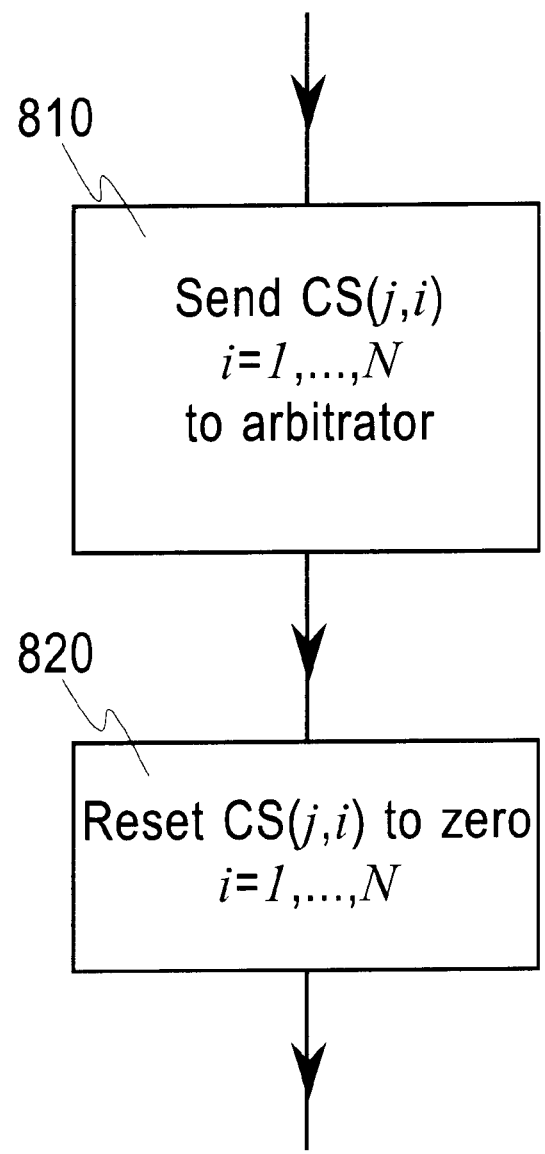
FIG. 8 is an example of the statistics reporting routine of the server.

FIG. 8 depicts an example of the statistics reporting routine (218). As depicted, in step 810, server j sends its load information CS(j,i), for i=1, . . . N, to the arbitrator. In step 820, the CS(j,i)s, for i=1, . . . , N, are reset to zero, i.e., to start the count for a new collection or measurement interval.

Figure 9:
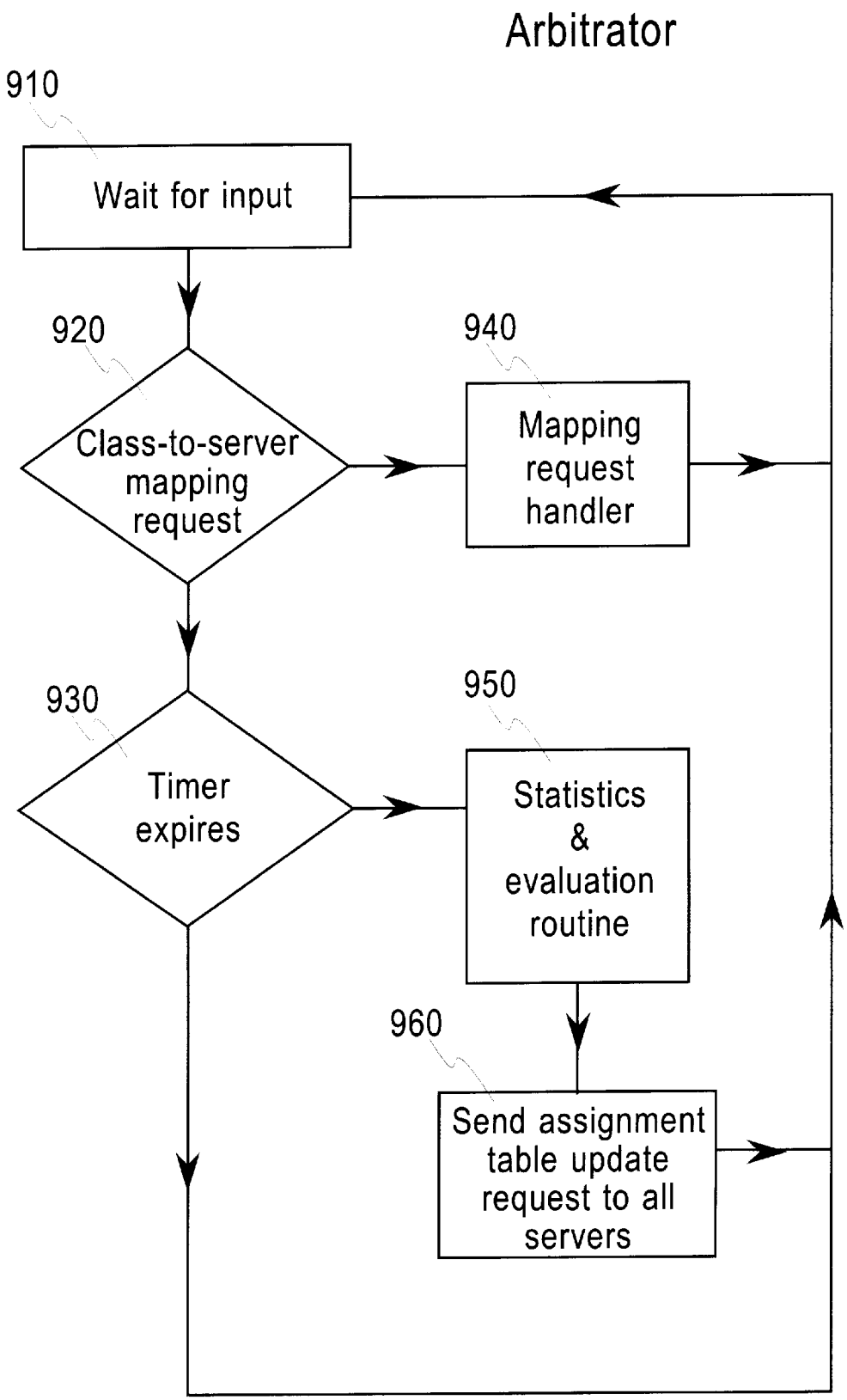
FIG. 9 is an example of the arbitrator logic of FIG. 2.

FIG. 9 depicts an example of the arbitrator logic (235). In step 910, the arbitrator waits for input. In step 920, if a mapping request is detected, the mapping request handler (248) is invoked, in step 940 (a detailed example of the mapping request handler (248) will be described with reference to FIG. 12). In step 930, if the expiration of a timer for the statistic collection interval is detected, the arbitrator executes the Statistic and Evaluation routine (250), in step 950 (a detailed example of Statistic and Evaluation routine (250) will be described with reference to FIG. 10). In step 960, an update request is communicated to all servers with the updated assignment table.

Figure 10:
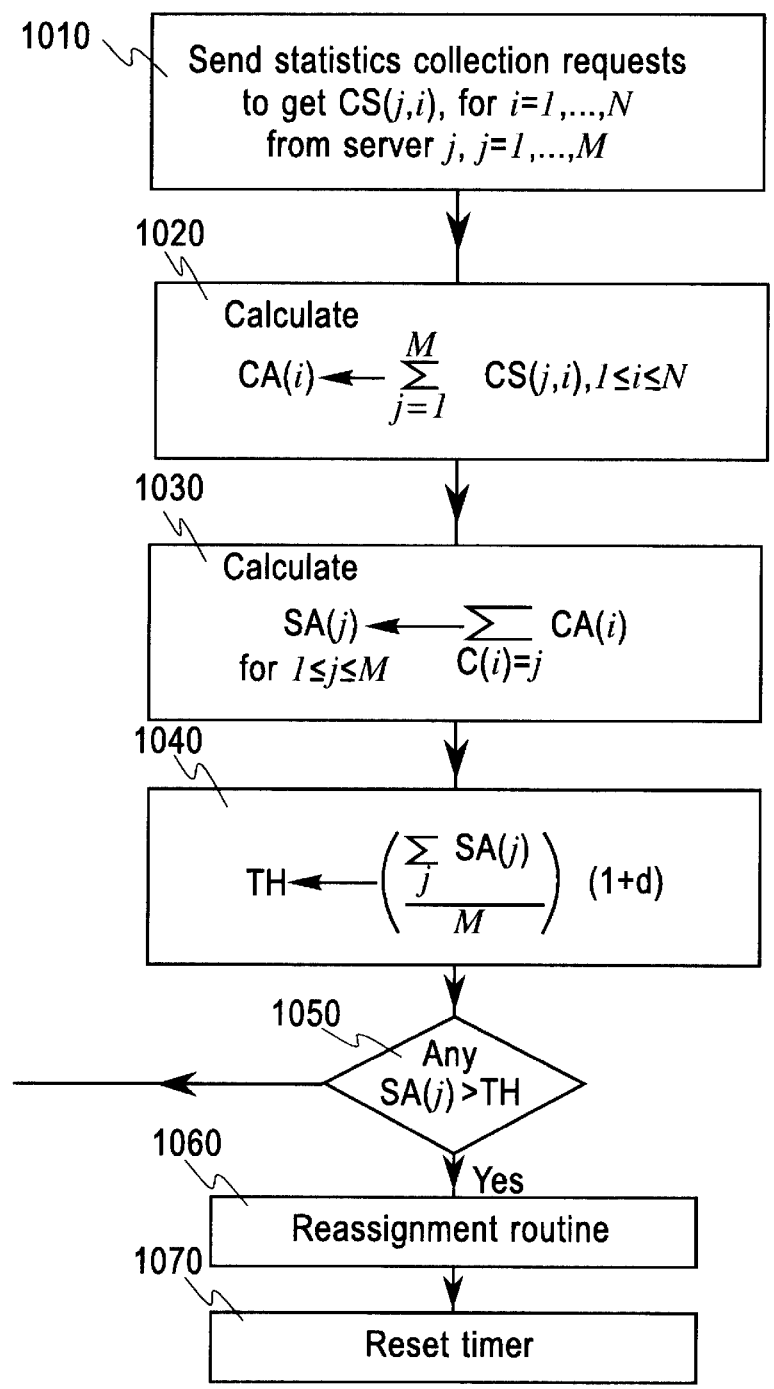
FIG. 10 is an example of the statistics and evaluation routine of the arbitrator.

FIG. 10 depicts an example of the Statistics and Evaluation routine (250). As depicted, in step 1010, statistics collection requests are communicated to all servers to get the CS(j,i), for i=1, . . . , N, from server j, for j=1, . . . , M. In step 1020, CA(i) is calculated for each class (the total number of requests across all servers for each class i). In step 1030, SA(j) is calculated for each server j, (the total number of requests to the assigned classes of each server j). In step 1040, the upper threshold, TH, of the load on a server is calculated. TH is preferably defined to be a fraction (d) above the average load. For example, d can be 0.2, which means, the target for load balancing is to have none of the servers exceeding 20% of the average. In step 1050, if any server's load exceeds the threshold TH, the Reassignment Routine is invoked to adjust the class-to-server assignment so that better load balancing can be achieved. A detailed example of the Reassignment Routine will be described with reference to FIG. 11. In step 1070, the statistics collection timer is reset to the length of the desired statistics collection interval.

Figure 11:
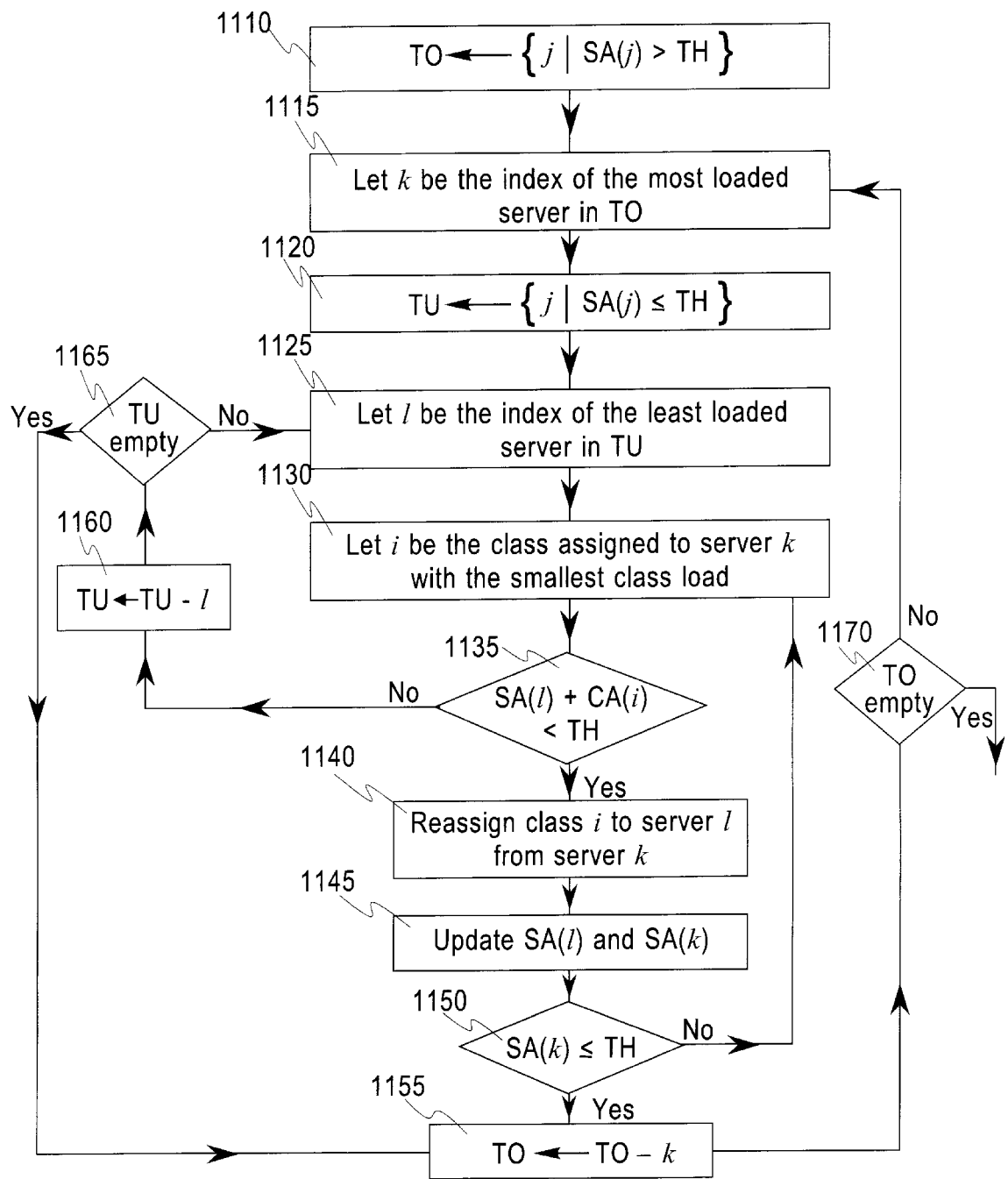
FIG. 11 is an example of the reassignment routine of the statistics and evaluation routine of the arbitrator.

FIG. 11 depicts an example of the Reassignment Routine (step 1060). In step 1110, TO includes the set of servers that exceed the loading threshold (TH). In step 1115, let k be the index of the most loaded server in TO. In step 1120, TU includes the set of servers that have not exceeded the loading threshold. In step 1125, let l be index of the least loaded server in TU; and in step 1130, let i be the class assigned to server k with the smallest class load, CA(i). In step 1135, if reassigning class i to sever l does not cause the load of server l to exceed the threshold, i.e., SA(l)+CA (i)<=TH, class i is reassigned to server l from server k in step 1140 (by changing C(i) to l) and SA(l) and SA(k); and in step 1145, SA(l) and SA(k) are updated to reflect the class reassignment. Specifically, SA(l)is incremented by CA(i) and SA(k) is decremented by CA(i). Otherwise, in step 1160, server l is deleted from TU as it is no longer able to accept load from the overloaded servers. In step 1150, if the load of server k still exceeds the threshold, i.e., SA(k)>TH, step 1130 is re-executed. Otherwise, in step 1155, server k is deleted from TO, since its load no longer exceeds the threshold. In step 1170, if TO is not empty, step 1115 is re-executed. In step 1165, if TU is not empty, step 1125 is re-executed.

Those skilled in the art will readily appreciate that various alternative embodiments and extensions to the present invention can be used within the spirit and scope thereof. For example, in step 1140, the reassignment is a simple greedy approach to allow the movement of a single Class (FIG. 3) from server k to server l to reduce a load imbalance. An extension would be to allow for a swap or exchange of one Class from server k with another class from server l if it can improve the load balance. In step 1135, the reassignment occurs only if server l does not exceed the load threshold. The criterion can be relaxed to instead measure whether the total overload is reduced. Furthermore, if any of the class load, CA(i), exceeds TH, it can be assigned to multiple servers where each of these servers will get a fraction of the requests for that class. The arbitrator can assign servers to requesters for that class probabilistically according to the fraction assigned to the server. A similar reassignment can be implemented at the server (208).

Furthermore, in the preferred embodiment it is assumed that all servers in the cluster have the same processing capacity. Those skilled in the art will readily appreciate that this can easily be extended to include heterogeneous servers. In the case of heterogeneous servers, the load balancing can be normalized, to reflect the number of requests received, divided by the processing capacity. Specifically, SA(j) can be normalized by the processing capacity of server j.

Note that FIG. 11 depicts an example of a method to make incremental dynamic improvements to the class-to-server assignment. Those skilled in the art will also appreciate that there are many alternative ways to provide an initial class-to-server assignment table can be used within the spirit and scope of the present invention. If no prior workload information is available, a random or round robin class-to-server assignment can be used. Otherwise, a least processing time first (LPT) algorithm can be used. Classes are sorted in decreasing order of their access load. The class on the top of the list (i.e. the one with the heaviest load) is first removed from the list and assigned to the least loaded server currently assigned. The assigned load of that server is then adjusted accordingly. The process repeats until all the classes are assigned.

Figure 12:
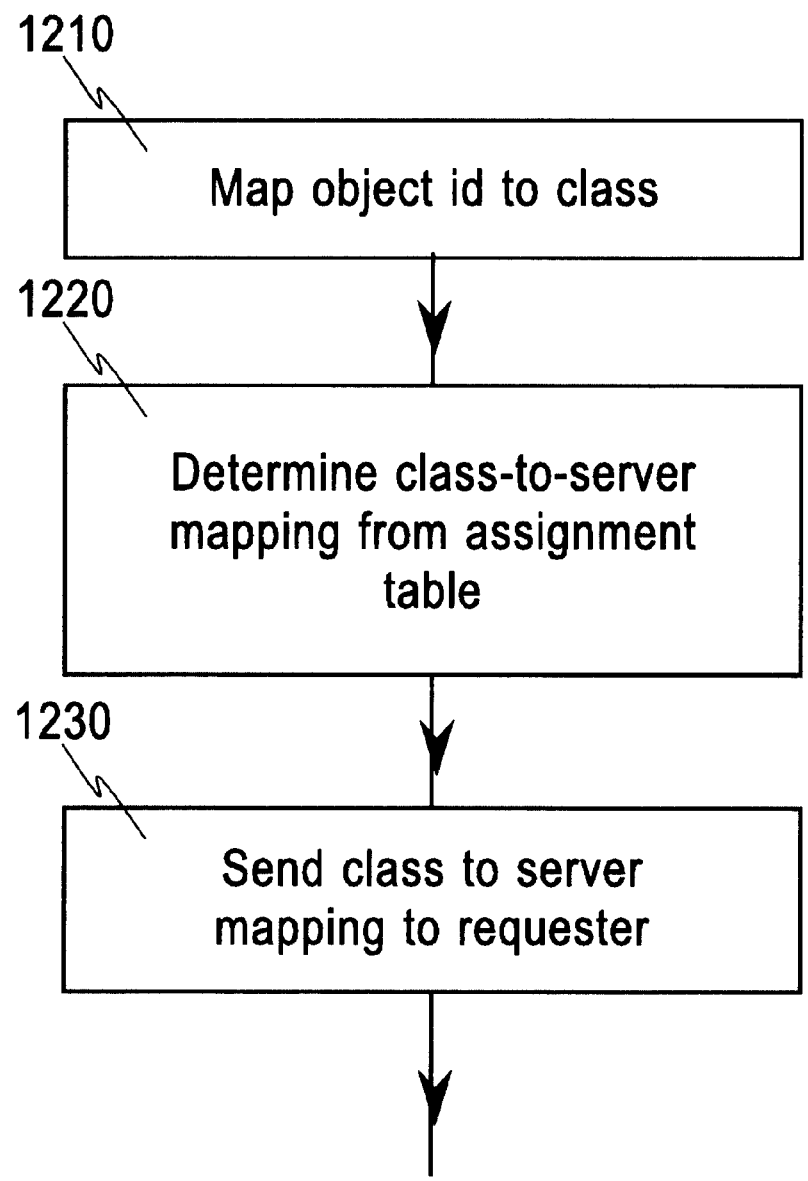
FIG. 12 is an example of the mapping request handler of the arbitrator.

FIG. 12 depicts an example of the mapping request handler (245). As depicted, in step 1210, the object id (e.g.

URL) is mapped to its class, for example via conventional hashing or other methods. This can be done, for example, by logically ORing the first 4 bytes of the URL logic with the last four bytes of the URL, and dividing the resulting number by the hash table size. The remainder will be a number between 0 and the hash table size minus one; this remainder represents the index into the hash table. In step 1220, the class-to-server mapping is determined from the assignment table (225). In step 1230, the mapping information is communicated to the requester.

Figure 13:
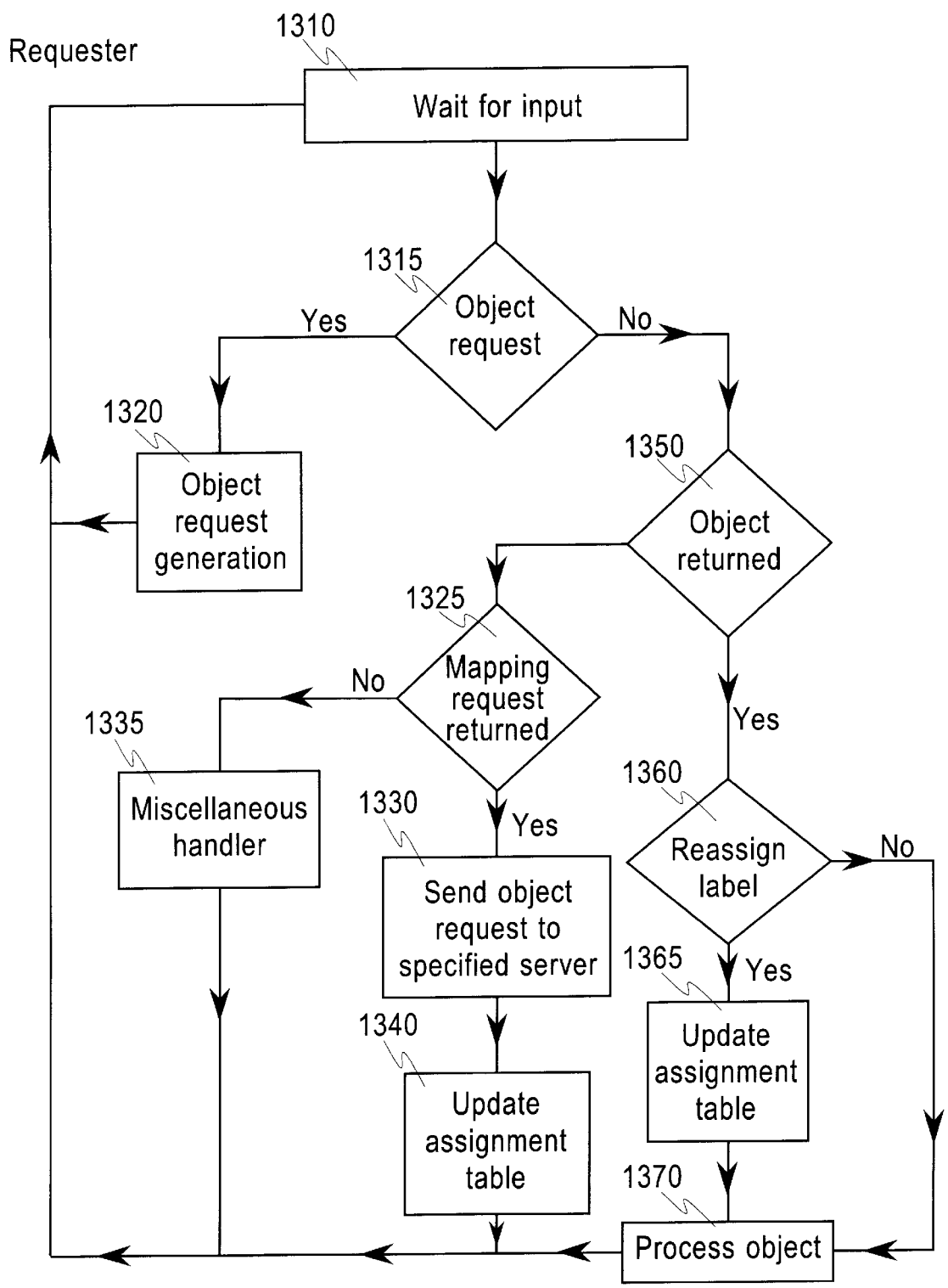
FIG. 13 is an example of the requester logic of FIG. 2.

FIG. 13 depicts an example of the requester (203) logic. In step 1310, the requester waits for input. In step 1315, for an object request, the Object Request Generation routine is invoked, in step 1320. The Object Request Generation routine determines which server (IP) address is to be selected based on the object identifier (e.g. URL) to achieve better locality at the server cache. A detailed example of the Object Request Generator routine will be described with reference to FIG. 14. In step 1315, if the input received is not an object request, the process proceeds to step 1350. In step 1350, if a (previously requested) object is returned, in step 1360, the object (HTTP) header is checked to see whether a a reassign label (R-label) is included. If so, in step 1365, the local assignment table (270) is updated to reflect the change in class-to-server assignment. In step 1370, the received object is processed. In step 1325, if a (previously requested as in step 1440) mapping request is returned, in step 1330, the (pending) object request is sent to the specified server. In step 1340, the local assignment table (270) is updated to reflect the class-to-server reassignment based on the mapping request. In step 1335, for other types of inputs, which are not the focus of the present invention (such as a push object) an appropriate miscellaneous handler can be invoked.

Figure 14:
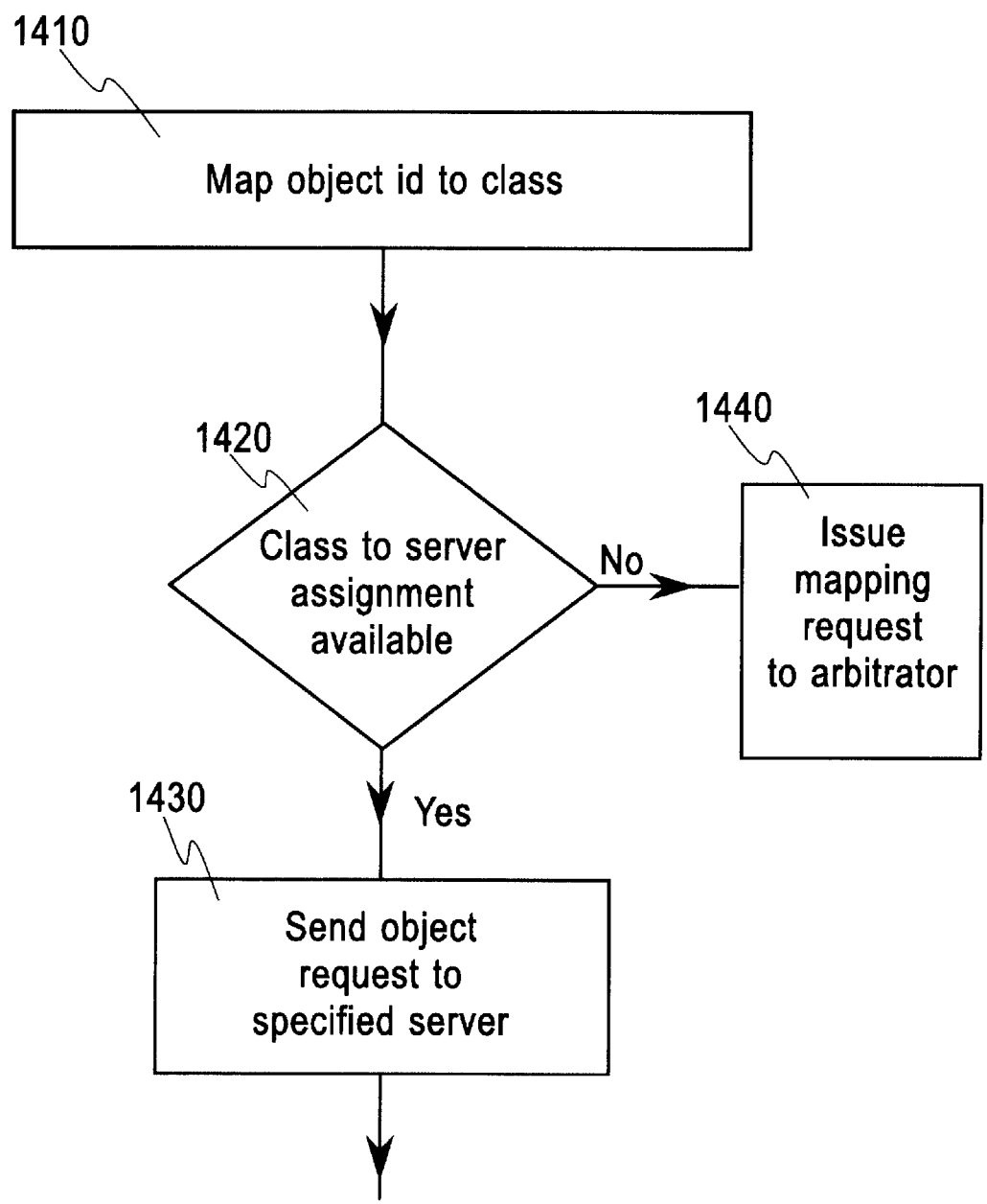
FIG. 14 is an example of the object request generation of the requester logic.

FIG. 14 depicts an example of the object request generation (267) logic. As depicted, in step 1410, the object is mapped to its object class. In step 1420, if the corresponding server is not available from the class-to-server assignment table, then in step 1440 a mapping request is sent to the arbitrator (the object request is thus delayed until the mapping request is completed as described in step 1330 of FIG. 13). Otherwise, in step 1430, the object request is sent to the server specified by the class-to-server assignment table.

Those skilled in the art will readily appreciate that various extensions to the present invention can be used within the spirit and scope thereof. For example, in the object request generation routine (step 1440), an arbitrary server in the cluster can be selected instead of issuing a mapping request. The mapping request table can also include a valid interval for each class-to-server mapping. When the interval expires, a mapping request can be issued (as in step 1440), in response to the next object request in that class.

Figure 15:
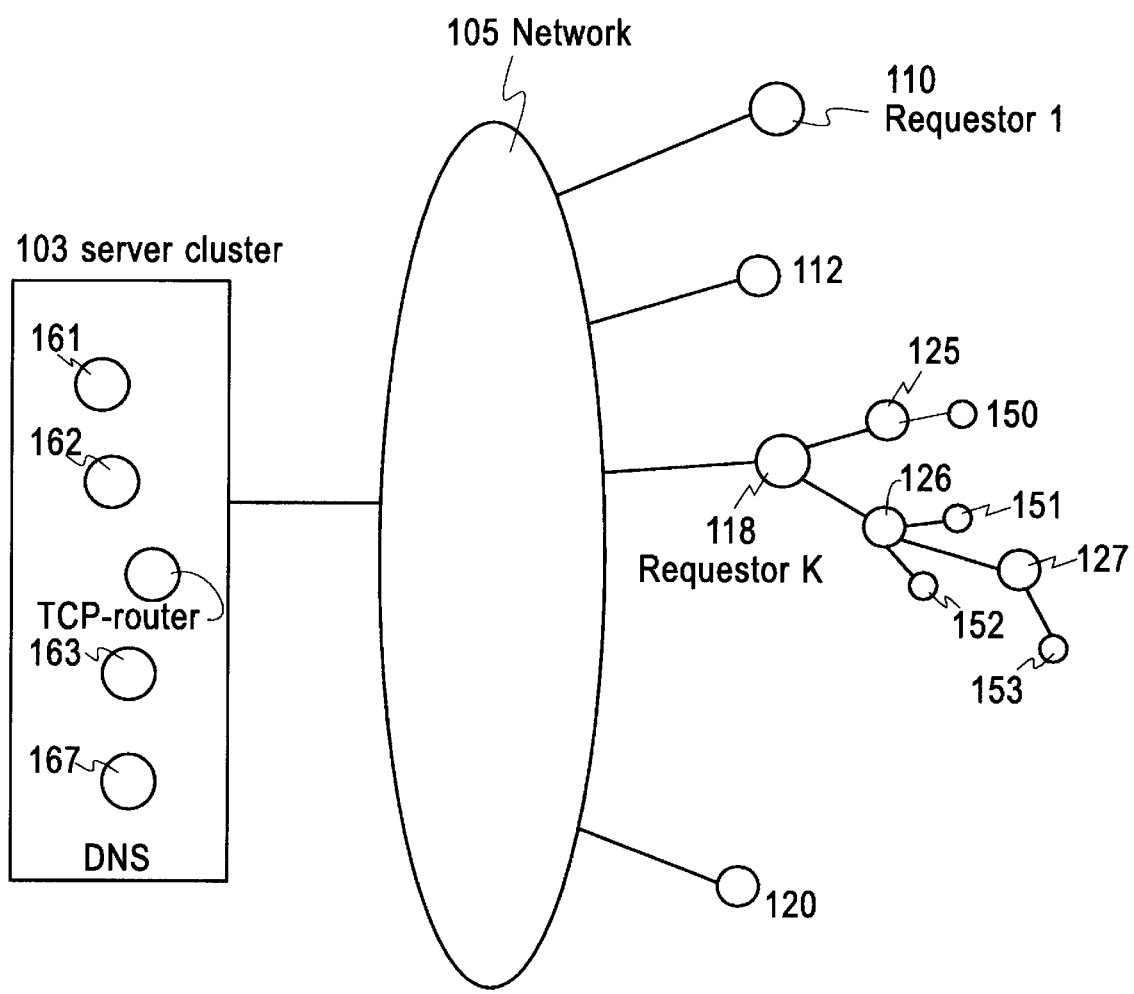
FIG. 15 is an example of the server cluster of FIG. 1, including a domain name-server (DNS).

Those skilled in the art will also appreciate that the present invention can be adapted to a hierarchical mapping of object identifiers to servers. For example, the present invention can work in conjunction with a conventional Domain Name Server (DNS) or TCP-based routing, as depicted in FIG. 15. Here, the class-to-server assignment table preferably assigns each Class (FIG. 3) to a virtual server. The number of virtual servers is greater than the actual number of servers in the server cluster. The DNS (167) and TCP router can then dynamically map each virtual server to one of the actual servers in the cluster.

Furthermore, the concept of updating routing information on server location by piggybacking meta information with requested objects can also be used to update a conventional DNS routing in the Internet. This is independent of the feature of using an object's URL (or Class) to make a server assignment to improve the cache hit ratio. DNS routing only tries to balance the load among multiple Web servers having replicated information (see e.g., "Scheduling Algorithms for Distributed Web Servers," by Colajanni, M., Yu, P., and Dias, D., IBM Research Report, RC 20680, January 1997). The conventional DNS has a TTL period for each name-to-address mapping. This mapping is cached at the various Name servers. This can result in the DNS having only limited control when it is used for cluster load balancing. According to the present invention, if a server in the cluster becomes overloaded, an alternative server IP address can be "piggybacked" (without additional network traffic) with the returned object (preferably using a PICS label or equivalent mechanism) to redirect traffic flow to another server in the cluster and thus improve the load balance.

In a preferred embodiment, the DNS (167) collects the number of requests issued from each requester and will generate a requester-to-server assignment table to balance the load among the servers. (For heterogeneous servers, the assigned load can be made proportional to the server's processing capacity). When a (name-to-address) mapping request arrives at the DNS (167), a server (161 . . . 163) is assigned based on the requester name (or IP address) in the assignment table. The mapping is hierarchical and multi-level, e.g., URL=>Class=>virtual server=>server. The DNS (167) can collect the load statistics and update the assignment table (225) based on a measurement interval (much) smaller than the TTL. Thus, a new assignment table can be quickly generated, to better reflect load conditions. All servers (161 . . . 163) get the up-to-date version of the assignment table (225) from the DNS (167). As before, the requesters (110 . . . 153) need not be informed of the change; they can still send requests based on the previous (name-to-address) mapping. However, if a server receives a request from a requester that is no longer assigned to that server, the server will inform the requester of the server (161 . . . 163) to which future requests should be issued. The current request will still be served and the new assignment information can be piggybacked, e.g., using PICS or a similar mechanism, with the response or returned object. When a server is overloaded, it can send an alarm signal to the DNS (167). Each time an alarm is received, the DNS (167) can recalculate the assignment table to reduce the number of requesters assigned to any overloaded servers. The requesters can also be partitioned into classes so that the assignment table can then become a class-to-server assignment.

An example of the DNS (167) routing logic is now described with reference to FIG. 15. Assume that a requester (110) is assigned a server (162) through DNS (I67). In the prior art, this mapping would be valid for some TTL interval, say of 5 minutes. According to the present invention, an updated assignment table can be generated in a shorter interval, say one minute, and the requester (110) assigned to a less loaded server (163). Requester (110) need not know of the change as yet; it still sends a next request to the same server (162). However, the server (162) has received the new assignment table from the DNS (167). Server (162) will serve the request, but piggyback a message with the returned object to tell the requester (110) to send future requests to server (163). This eliminates the adverse effects of the TTL without increasing traffic.

Those skilled in the art will further appreciate that the dynamic routing method of the present invention also works in a heterogeneous requester environment, where some of the requesters are conventional proxies/client stations which do not understand the routing protocol and do not participate in the collaboration to improve the cache hit ratio and the load balance.

Now that a preferred embodiment of the present invention has been described, with alternatives, various modifications and improvements will occur to those of skill in the art. Thus, the detailed description should be understood as an example and not as a limitation. The proper scope of the invention is properly defined by the appended claims.

What is claimed is:

1. A method for communicating routing information between requester and server nodes, said server nodes serving requests for objects, the method comprising the steps of:
    piggybacking meta information with a requested object; and
    dynamically updating the routing information for a server assignment according to the meta information.

2. The method of claim 1, further comprising the steps of:
    balancing a load among the server nodes, wherein said step of balancing the load comprises optimizing cache hits for the requested object.

3. The method of claim 2, further comprising the steps of:
    mapping an object identifier to a class; and
    assigning a server based on the class and a class-to-server assignment table.

4. The method of claim 3, said mapping step further comprising the step of mapping the object identifier into classes or hash classes via a hash table.

5. The method of claim 2, wherein a server selection method at the requester is provided to reduce assignment request traffic, comprising the steps of:
    maintaining a class-server assignment table at a requestor node for the server selection, including the steps of:
    mapping an object identifier for each object request to a class, wherein if no valid server assignment is available in the class-server assignment table, then issuing a mapping request to an arbitrator; and
    in response to said mapping step, updating the class-server assignment table.

6. The method of claim 2, wherein a server selection method at the requester is provided for reducing assignment request traffic, comprising the steps of:
    maintaining a class-server assignment table at a requester node for the server selection, including the steps of:
        mapping an object identifier for each object request to a class, wherein if no valid server assignment is available in the class-server assignment table, then selecting a server; and
        updating the class-server assignment table with a selected server, in response to said selecting step.

7. The method of claim 2, wherein said step of balancing the load, further comprises the step of assigning classes to server nodes as a function of the load associated with each class.

8. The method of claim 2, wherein said step of balancing the load, further comprises the step of incrementally reassigning classes to servers.

9. The method of claim 1, further comprising the step of balancing a load among the server nodes.

10. The method of claim 9, further comprising the step of assigning a server according to a hierarchical mapping of an object identifier or IP address.

11. The method of claim 9, further comprising the step of mapping a requester identifier to a class; and assigning a server based on class.

12. The method of claim 9, further comprising the steps of:
    the server communicating updated meta information to the requester; and
    the requester updating the assignment.

13. The method of claim 1, wherein the collection of server nodes is a cluster of proxy servers or a cluster of Web servers in an Internet environment.

14. The method of claim 1, further comprising the step of assigning a server according to a hierarchical mapping of an object identifier.

15. The method of claim 14, wherein the object identifier is a URL.

16. The method of claim 14, wherein the step of assigning a server according to a hierarchical mapping of an object identifier, further comprises the steps of:
    assigning each cluster to a virtual server node; and
    dynamically mapping the virtual server node to a real server node.

17. The method of claim 16, wherein the collection of server nodes include a domain name-server (DNS) wherein said dynamically mapping step includes a name-to-address mapping and a time-to-live period (TTL) associated with the name-to-address mapping, further comprising the steps of:
    the DNS dynamically mapping the virtual server node to the real server node at an interval less than the TTL;
    communicating an updated server mapping to all servers;
    wherein said meta information includes the updated server mapping; and
    wherein said step of dynamically updating routing requests includes the step of routing subsequent object requests according to the updated server mapping.

18. The method of claim 16, wherein the collection of server nodes include a TCP router, further comprising the step of, the router dynamically mapping the virtual server node to a real proxy node.

19. The method of claim 1, wherein said piggybacking step comprises using a PICS protocol to update the routing information.

20. The method of claim 1, further comprising the step of each requesting node communicating a request for a current server assignment for an object.

21. The method of claim 20, wherein said step of communicating a request uses a PICS protocol to determine the current server assignment based on a class of the requested object.

22. The method of claim 1, further comprising a heterogeneous requester environment wherein not all requesters are adapted to perform said dynamically updating step.

23. A dynamic routing method among a plurality of proxy server nodes serving requests for objects, comprising the steps of:
    assigning a server according to an object identifier of a requested object;
    communicating an updated server assignment to an object requester, in response to said assigning step.

24. The method of claim 23, wherein said step of assigning a server comprises the step of assigning the server according to a hierarchical mapping of the object identifier.

25. The method of claim 23, further comprising the steps of:
    mapping an object identifier to a class; and
    assigning a server based on the class and a class-to-server assignment table.

26. The method of claim 23, wherein a server selection method at the requester is provided to reduce the assignment request traffic, comprising the steps of maintaining a class-server assignment table at a requester node for the server selection, including the steps of:
mapping the object identifier for each object request to a class;
if no valid server assignment is available in the class-server assignment table, then issuing a mapping request to an arbitrator;
in response to said mapping step, updating the class-server assignment table.

27. The method of claim 23, wherein a server selection method at the requester is provided to reduce the assignment request traffic, comprising the steps of:
maintaining a class-server assignment table at a requester node for the server selection, including the steps of:
mapping the object identifier for each object request to a class;
if no valid server assignment is available in the class-server assignment table, then selecting a server; and
updating the class-server assignment table with a selected server, in response to said selecting step.

28. The method of claim 23, wherein object requests directed to a same host name or address are assigned to different servers in the proxy server nodes according to the object identifier of the requested object.

29. A dynamic routing method among a plurality of Web server nodes serving requests for objects, comprising the steps of:
assigning object requests directed to a same host name or address, to different servers in the plurality of Web server nodes according to an identifier of a requested object;
communicating an updated server assignment to an object requester; and
the object requestor dynamically maintaining the updated server assignment for the requested object for subsequent object requests.

30. The method of claim 29, wherein said step of assigning object requests comprises the step of assigning the object requests according to a hierarchical mapping of the object identifier.

31. The method of claim 29, further comprising the steps of:
mapping an object identifier to a class; and
assigning a server based on the class and a class-to-server assignment table.

32. The method of claim 29, wherein a server selection method at the requester is provided to reduce the assignment request traffic, comprising the steps of:
maintaining a class-server assignment table at a requester node for the server selection, including the steps of:
mapping the object identifier for each object request to a class;
if no valid server assignment is available in the class-server assignment table, then issuing a mapping request to an arbitrator; and
in response to said mapping step, updating the class-server assignment table.

33. The method of claim 29, wherein a server selection method at the requester is provided to reduce the assignment request traffic, comprising the steps of:
maintaining a class-server assignment table at a requester node for the server selection, including the steps of:
mapping the object identifier for each object request to a class;
if no valid server assignment is available in the class-server assignment table, then selecting a server; and
updating the class-server assignment table with a selected server, in response to said selecting step.

34. The program storage device of claim 29, wherein a server selection method at the requester is provided to reduce the assignment request traffic, comprising the steps of:
maintaining a class-server assignment table at a requester node for the server selection, including the steps of:
mapping the object identifier for each object request to a class;
if no valid server assignment is available in the class-server assignment table, then selecting a server; and
updating the class-server assignment table with a selected server, in response to said selecting step.

35. A dynamic routing method for a collection of server nodes, wherein requests to the collection of server nodes can be assigned to different servers in the cluster, said method comprising the steps of:
a requester periodically communicating mapping requests, including one of a requester identifier or IP address, to a server;
mapping said one of a requester identifier or IP address to a server in the collection of server nodes based on one of a requester load and a server capacity;
communicating a server mapping to all servers, in response to said mapping step; and
if one of the servers receives a request from a requester no longer assigned to that server, the server informing the requester of a change of requester-to-server assignment.

36. The method of claim 35, wherein said step of informing the requester, further comprises the step of: the server serving the request.

37. The method of claim 35, further comprising the steps of:
partitioning the requester identifier or IP address into classes; and
maintaining a class-to-server assignment table at an arbitrator server and in the collection of servers.

38. The method of claim 37, wherein the arbitrator server comprises a DNS in an Internet environment.

39. A program storage device readable by a machine, tangibly embodying a program of instructions executable on the machine to perform method steps for communicating routing information between requester and server nodes, said server nodes serving requests for objects, said method steps comprising:
piggybacking meta information with a requested object; and
dynamically updating the routing information for a server assignment according to the meta information.

40. The program storage device of claim 39, further comprising the steps of:
balancing a load among the server nodes, wherein said step of balancing the load optimizes cache hits for the requested object.

41. The program storage device of claim 40, further comprising the steps of:
mapping an object identifier to a class; and
assigning a server based on the class and a class-to-server assignment table.

42. The program storage device of claim 41, said mapping step further comprising the step of mapping the object identifier into classes or hash classes via a hash table.

43. The program storage device of claim 40, wherein a server selection method at the requester is provided to reduce the assignment request traffic, comprising the steps of maintaining a class-server assignment table at a requester node for the server selection, including the steps of:
  mapping the object identifier for each object request to a class;
  if no valid server assignment is available in the class-server assignment table, then issuing a mapping request to an arbitrator; and
  in response to said mapping step, updating the class-server assignment table.

44. The program storage device of claim 40, wherein a server selection method at the requester for reducing assignment request traffic, comprising the steps of:
  maintaining a class-server assignment table at a requester node for the server selection, including the steps of:
    mapping the object identifier for each object request to a class;
    if no valid server assignment is available in the class-server assignment table, then selecting a server; and
    updating the class-server assignment table with a selected server, in response to said selecting step.

45. The program storage device of claim 40, wherein said step of balancing the load, further comprises the step of assigning classes to server nodes as a function of the load associated with each class.

46. The program storage device of claim 40, wherein said step of balancing the load, further comprises the step of incrementally reassigning classes to servers.

47. The program storage device of claim 39, further comprising the step of balancing a load among the server nodes.

48. The program storage device of claim 47, further comprising the step of assigning a server according to a hierarchical mapping of an object identifier or IP address.

49. The program storage device of claim 47, further comprising the step of mapping a requester identifier to a class; and assigning a server based on class.

50. The program storage device of claim 47, further comprising the steps of:
  the server communicating updated meta information to the requester; and
  the requester updating the assignment.

51. The program storage device of claim 39, further comprising the step of assigning a server according to a hierarchical mapping of an object identifier.

52. The program storage device of claim 51, wherein the object identifier is a URL.

53. The program storage device of claim 51, wherein the step of assigning a server according to a hierarchical mapping of an object identifier, further comprises the steps of:
  assigning each cluster to a virtual server node; and
  dynamically mapping the virtual server node to a real server node.

54. A program storage device of claim 53, wherein the collection of server nodes include a domain name-server (DNS) wherein said dynamically mapping step includes a name-to-address mapping and a time-to-live period (TTL) associated with the name-to-address mapping, further comprising the steps of:
  the DNS dynamically mapping the virtual server node to the real server node at an interval less than the TTL;
  communicating an updated server mapping to all servers;
  wherein said meta information includes the updated server mapping; and
  wherein said step of dynamically updating routing requests includes the step of routing subsequent object requests according to the updated server mapping.

55. A program storage device of claim 53, wherein the collection of server nodes include a TCP router, further comprising the step of, the router dynamically mapping the virtual server node to a real proxy node.

56. The program storage device of claim 39, wherein the collection of server nodes is a cluster of proxy servers or a cluster of Web servers in an Internet environment.

57. The program storage device of claim 39, wherein said piggybacking step comprises using a PICS protocol to update the routing information.

58. The program storage device of claim 39, further comprising the step of each requesting node communicating a request for a current server assignment for an object.

59. The program storage device of claim 58, wherein said step of communicating a request uses a PICS protocol to determine the current server assignment based on a class of the requested object.

60. The program storage device of claim 39, further comprising a heterogeneous requester environment wherein not all requesters are adapted to perform said dynamically updating step.

61. The program storage device of claim 39, wherein the server is assigned according to an object identifier of the requested object.

62. A program storage device readable by a machine, tangibly embodying a program of instructions executable on the machine to perform method steps for dynamically routing object requests among a collection of server nodes serving requests for objects, said method steps comprising:
  assigning a server according to an object identifier of a requested object;
  communicating an updated server assignment to an object requester, in response to said assigning step.

63. A program storage device of claim 62, wherein said step of assigning a server comprises the step of assigning the server according to a hierarchical mapping of the object identifier.

64. A program storage device of claim 62, further comprising the steps of:
  mapping an object identifier to a class; and
  assigning a server based on the class and a class-to-server assignment table.

65. A program storage device of claim 62, wherein a server selection method at the requester is provided to reduce the assignment request traffic, comprising the steps of
  maintaining a class-server assignment table at a requester node for the server selection, including the steps of:
    mapping the object identifier for each object request to a class;
    if no valid server assignment is available in the class-server assignment table, then issuing a mapping request to an arbitrator;
    in response to said mapping step, updating the class-server assignment table.

66. The program storage device of claim 62, wherein a server selection method at the requester is provided to reduce the assignment request traffic, comprising the steps of:
  maintaining a class-server assignment table at a requester node for the server selection, including the steps of:
    mapping the object identifier for each object request to a class;
    if no valid server assignment is available in the class-server assignment table, then selecting a server; and
    updating the class-server assignment table with a selected server, in response to said selecting step.

67. The program storage device of claim 62, wherein object requests directed to a same host name or address are assigned to different servers in the server nodes according to the object identifier of the requested object.

68. A program storage device readable by a machine, tangibly embodying a program of instructions executable on the machine to perform method steps for dynamically routing object requests among a plurality of Web server nodes serving requests for objects, said method steps comprising:

assigning object requests directed to a same host name or address, to different servers in the cluster according to an identifier of a requested object;

communicating an updated server assignment to an object requester; and the object requester dynamically maintaining the updated server assignment for the requested object for subsequent object requests.

69. The program storage device of claim 68, wherein said step of assigning object requests comprises the step of assigning the object requests according to a hierarchical mapping of the object identifier.

70. The program storage device of claim 68, further comprising the steps of:

mapping an object identifier to a class; and assigning a server based on the class and a class-to-server assignment table.

71. The program storage device of claim 68, wherein a server selection method at the requester is provided to reduce the assignment request traffic, comprising the steps of:

maintaining a class-server assignment table at a requester node for the server selection, including the steps of:
mapping the object identifier for each object request to a class;

if no valid server assignment is available in the class-server assignment table, then issuing a mapping request to an arbitrator; and in response to said mapping step, updating the class-server assignment table.

72. A program storage device readable by a machine, tangibly embodying a program of instructions executable on the machine to perform method steps for dynamically routing object requests among a collection of server nodes serving requests for objects, said method steps comprising:

a requester periodically communicating mapping requests, including one of a requester identifier or IP address, to a server;

mapping said one of a requester identifier or IP address to a server in the collection of server nodes based on one of a requester load and a server capacity;

communicating a server mapping to all servers, in response to said mapping step; and if one of the servers receives a request from a requester no longer assigned to that server, the server informing the requester of a change of requester-to-server assignment.

73. The program storage device of claim 72, wherein said step of informing the requester, further comprises the step of: the server serving the request.

74. The program storage device of claim 72, further comprising the steps of:

partitioning the requester identifier or IP address into classes; and maintaining a class-to-server assignment table at an arbitrator server and in the collection of servers.

75. The program storage device of claim 74, wherein the arbitrator server comprises a DNS in an Internet environment.

\* \* \* \* \*